United States Patent Office 3,284,188
Patented Nov. 8, 1966

3,284,188
METHOD AND COMPOSITION FOR SUPPRESSING THE NITRIFICATION OF AMMONIUM NITROGEN IN SOIL
Michio Amagasa, Fukisawa, Kanagawa, Kisaburo Ueno, Kanagawa, and Masato Koshi, Akira Hirose, and Tetsuichi Shinozawa, Yokohama, Japan, assignors to Toyo Koatsu Industries, Incorporated, Chuo-ku, Tokyo, Japan, a corporation of Japan
No Drawing. Filed Mar. 23, 1964, Ser. No. 354,102
Claims priority, application Japan, Apr. 12, 1963, 38/17,893
8 Claims. (Cl. 71—54)

This invention relates to a method of suppressing the nitrification of ammonium nitrogen in soil and a fertilizer composition therefore.

Since most plants obtain the greater part or all of nitrogen requirements from the soil, it is one of the most important agricultural problems to provide nutrient nitrogen for the growth of plants in soil. Nitrogen in soil is present in the three forms of organic nitrogen, ammonium nitrogen and nitrate nitrogen. Among them, ammonium nitrogen and nitrate nitrogen are well absorbed from soil and utilized by plants.

The organic nitrogen in soil consists of various compounds and originates from manure, organic fertilizers and crop residues. Except such organic reduced nitrogen fertilizer as urea, those compounds are generally so insoluble in water as not to be readily leached from soil, but they are not directly available to the plants for use. In order to be available to the plants, the organic nitrogen must be converted to ammonia or ammonium salts by soil bacteria. Such conversion occurs very quickly in the case of such organic reduced nitrogen fertilizer as urea, but very slowly in the case of other organic nitrogen compounds. Subsequent to the conversion, ammonium nitrogen is very quickly oxidized into inorganic nitrate nitrogen by soil bacteria. Such mineralization of organic nitrogen constantly feeds soil with nitrogen which can be utilized by plants.

The ammonium nitrogen in soil is derived from bacterial conversion of organic nitrogen, or from added reduced nitrogen fertilizers such as anhydrous ammonia, aqueous ammonia, ammonium sulfate, ammonium nitrate and ammonium phosphate. These ammonium compounds are readily soluble in water or aqueous soil medium to produce ammonium ion. As soil is a kind of cation exchanger, ammonium ion is strongly adsorbed by soil and is held in soil due to the cationic nature of this ion.

The nitrate nitrogen in soil is derived from the nitrification of ammonium nitrogen by soil bacteria or from the added inorganic nitrate fertilizers such as sodium nitrate, ammonium nitrate or calcium nitrate. These nitrate compounds are readily soluble in water or aqueous soil medium to produce nitrate ion. Due to the anionic nature of this ion, nitrate ion is not adsorbed by soil. Therefore, the nitrate nitrogen is quickly leached by rainfall or irrigation and is readily lost. Further, the nitrate nitrogen is reduced to nitrogen gas by soil bacteria. (This process is known as denitrification.) The nitrate nitrogen is so easily lost from soil as described above that the rate of its utilization by plants is very low.

Thus, in order that the nitrogen in soil can be leached from the soil or lost by denitrification, it must be present as nitrate nitrogen. Therefore, in order to prevent the loss of nitrogen from soil and to improve the rate of utilization of nitrogen by plants, it is necessary to suppress the nitrification of ammonium nitrogen by soil bacteria.

An object of the present invention is to provide an improved method of preventing the loss of soil nitrogen.

Another object of the present invention is to provide an improved method of suppressing the nitrification of ammonium nitrogen in soil.

A further object of the present invention is to provide a new fertilizer composition to be employed in the method of the present invention.

The subject matter of the present invention is a method of suppressing the nitrification of ammonium nitrogen in soil comprising treating the soil in a plant growing area with a pyrimidine derivative having the general formula

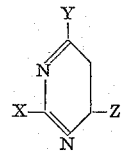

wherein X represents amino, chlorine or trichloromethyl, Y represents hydrogen, amino, chlorine or trichloromethyl and Z represents methyl, chlorine or trichloromethyl but X, Y and Z are neither chlorine nor trichloromethyl simultaneously.

Examples of such pyrimidine derivatives include 2,4-dichloro-6-trichloromethylpyrimidine,
2-chloro-4,6-di(trichloromethyl)pyrimidine,
2-trichloromethyl-4,6-dichloropyrimidine,
2-amino-4-chloro-6-methylpyrimidine,
2-amino-4-chloro-6-trichloromethylpyrimidine,
2-amino-4,6-di(trichloromethyl)pyrimidine,
2-chloro-4-amino-6-trichloromethylpyrimidine,
2-chloro-6-trichloromethylpyrimidine and
2-amino-6-methylpyrimidine.

These pyrimidine derivatives are crystalline solid materials which can be easily distributed in soil.

By the method of the present invention, the conversion of ammonium nitrogen in soil to nitrate nitrogen is inhibited and ammonium nitrogen can be prevented from being quickly lost from soil. This inhibiting action lasts for more than two months. The ammonium nitrogen in such case may derive from administered fertilizer containing ammonium nitrogen, for example, ammonia or ammonium salts, or may be formed by conversion of an organic nitrogen constituent in soil or by the conversion of organic fertilizer administered to soil.

In treating soil with the pyrimidine derivatives, it is preferable to impregnate soil below the soil surface in a plant growing area with the pyrimidine derivatives so that the concentration of the derivative in the soil is 1 to 100 parts by weight, specifically 1 to 30 parts by weight per million parts by weight of the soil. It is preferable that the amount of administration of the pyrimidine derivative is made at least 5 grams per 100 square meter of the plant growing area.

Such pyrimidine derivative may be distributed on a plant growing area prior to, simultaneously with or subsequent to the administration of a nitrogen fertilizer. Further, when the soil is treated with the pyrimidine derivatives after the harvest of crops, ammonium nitrogen produced from organic substances in the soil can be preserved for the next growing season.

In treating a plant growing area with the pyrimidine derivatives, the pyrimidine derivatives may be used as mixed with a soil treating adjuvant including water, a petroleum distillate or other organic solvent, surface active agent, fine powdered inert solid and nitrogen fertilizer.

The concentration of the pyrimidine derivatives in such composition is not critical but can be made any amount below 95% of the adjuvant-pyrimidine composition. For the inert solid carrier is used talc, chalk, gypsum, vermiculite, bentonite or diatomaceous earth.

A composition composed of the pyrimidine derivatives and a fertilizer is most desirable in working the method of the present invention. Such composition is produced by dispersing the pyrimidine derivatives in such reduced nitrogen fertilizer as ammonia, ammonium salts or urea. Further, such composition may contain a phosphate and/or potassium salt. The reduced nitrogen fertilizer may be either solid or liquid.

It is preferable that the pyrimidine derivatives in such fertilizer composition are at least 0.5% by weight based on the weight of nitrogen present as reduced nitrogen in the fertilizer.

In dispersing the pyrimidine derivatives in a reduced nitrogen fertilizer, these may be mechanically mixed with the fertilizer, or may be sprayed on the surfaces of the fertilizer in the form of organic solvent solution such as acetone solution, or may be melted together with such fertilizer of a comparatively low melting point as urea to mix the pyrimidine derivatives with the fertilizer.

In working the method of the present invention, soil can be treated with the pyrimidine derivatives or the compositions containing the pyrimidine derivatives by any convenient methods. For example, the pyrimidine derivatives or the compositions containing them may be mechanically mixed with the soil or may be distributed on the surface of the soil and then mixed into the soil by plowing the soil. Further, the fertilizer compositions including the pyrimidine derivatives can be administered in the same manner as of administering an ordinary fertilizer.

The following examples explain the present invention but are not construed as limiting. In the examples, the parts are by weight.

Example 1

There were prepared a mixture (I) obtained by adding 0.05 part of 2,4-dichloro-6-trichloromethyl-pyrimidine to 54 parts of urea and uniformly mixing them, a mixture (II) obtained by adding 0.5 part of 2,4-dichloro-6-trichloromethylpyrimidine to 54 parts of urea and uniformly mixing them and a mixture (III) obtained by adding 5 parts of 2,4-dichloro-6-trichloromethylpyrimidine to 54 parts of urea and uniformly mixing them. 50 g. of soil were uniformly mixed with each of 54 mg. of the mixture (I), 54.5 mg. of the mixture (II) and 59 mg. of the mixture (III). Each of the resulting mixtures contained 25 mg. of nitrogen per 50 g. of the soil. The concentration of 2,4-dichloro-6-trichloromethylpyrimidine in the soil was respectively 1 p.p.m., 10 p.p.m. and 100 p.p.m. Each of said mixtures was put into a conical flask of a capacity of 100 cc. Water was added thereto so that the water content in the soil was 60% of the water capacity. The flask was plugged with cotton. The contents were incubated at 28° C. for 24 days. After the completion of the incubation, the nitrogen in the soil was analyzed in respective forms. Thus the results in Table 1 were obtained.

The same experiments as were described above were carried out also on 2-chloro-4,6-di(trichloromethyl)pyrimidine,
2-amino-4-chloro-6-methylpyrimidine,
2-amino-4-chloro-6-trichloromethylpyrimidine,
2-chloro-4-amino-6-trichloromethylpyrimidine,
2-chloro-6-trichloromethylpyrimidine and
2-trichloromethyl-4,6-dichloropyrimidine.

The results obtained are shown in Table 1. The data are mean values in two experiments.

Further, for comparison, there are shown the analysis values of nitrogen in the respective forms in case soil alone and 50 g. of soil with the addition of 54 mg. of urea were incubated in the same manner as in the above described experiment.

TABLE 1

| Treating compositions | Forms of nitrogen | N in mg./50 g. of soil | | |
|---|---|---|---|---|
| | | Concentration of the pyrimidine derivative in soil | | |
| | | 1 p.p.m. | 10 p.p.m. | 100 p.p.m. |
| Urea+2,4-dichloro-6-trichloromethylpyrimidine | $NH_4-N$ | 2.4 | 9.0 | 20.7 |
| | $NO_3-N$ | 20.3 | 13.0 | 0.7 |
| Urea+2-chloro-4,6-di(trichloromethyl)pyrimidine | $NH_4-N$ | 1.2 | 11.7 | 19.8 |
| | $NO_3-N$ | 20.4 | 9.7 | 2.5 |
| Urea+2-amino-4-chloro-6-methylpyrimidine | $NH_4-N$ | 1.6 | 14.1 | 16.7 |
| | $NO_3-N$ | 19.8 | 6.8 | 5.3 |
| Urea+2-amino-4-chloro-6-trichloromethylpyrimidine | $NH_4-N$ | 1.5 | 13.0 | 18.3 |
| | $NO_3-N$ | 21.8 | 10.3 | 4.9 |
| Urea+2-chloro-4-amino-6-trichloromethylpyrimidine | $NH_4-N$ | 2.0 | 11.8 | 16.5 |
| | $NO_3-N$ | 21.0 | 12.4 | 5.8 |
| Urea+2-chloro-6-trichloromethylpyrimidine | $NH_4-N$ | 1.8 | 12.3 | 17.5 |
| | $NO_3-N$ | 22.1 | 10.7 | 5.1 |
| Urea+2-trichloromethyl-4,6-dichloropyrimidine | $NH_4-N$ | 2.3 | 10.5 | 17.3 |
| | $NO_3-N$ | 20.9 | 12.6 | 5.3 |
| Urea | $NH_4-N$ | 0.7 | | |
| | $NO_3-N$ | 22.9 | | |
| None (soil alone) | $NH_4-N$ | 0.6 | | |
| | $NO_3-N$ | 0 | | |

Example 2

5 parts of 2-chloro-4,6-di(trichloromethyl)-pyrimidine and 95 parts of talc were uniformly mixed and pulverized to be a powder. 5 parts of the powder were mixed with 20 parts of ammonium sulfate uniformly. 90 mg. of the resulting mixture were well mixed with 50 g. of soil. The mixture was put into a conical flask of a capacity of 100 cc. Water was added to the mixture so that the water content in the soil was 60% of the water capacity. The flask was plugged with cotton. The contents were incubated at 28° C. for 20 days. The nitrogen in the soil was analyzed in respective forms. The results were as in Table 2. The data are mean values of three experiments.

Further, for comparison, there are also mentioned the results of incubation of the soil alone under the same conditions and of the soil with the addition of the same amount of ammonium sulfate as in the above described experiment under the same conditions.

TABLE 2

| Treating compositions | $NH_4-N$ N in mg./50 g. of soil | $NO_3-N$ N in mg./50 g. of soil |
|---|---|---|
| None (soil alone) | 0.1 | 0.4 |
| Ammonium sulfate | 0.4 | 14.0 |
| Ammonium sulfate+2-chloro-4,6-di(trichloromethyl)pyrimidine | 10.8 | 3.7 |

Example 3

30 parts of 2-amino-4-chloro-6-methylpyrimidine, 10 parts of sodium dodecyl benzene sulfonate and 60 parts of white carbon were mixed and pulverized. 7 g. of this mixture were suspended in 1 liter of water. 7.5 cc. of this suspension were added to 1.2 liters of an aqueous solution of urea and were well stirred. 12 cc. of the resulting solution were added to 50 g. of soil. The resulting mixture was incubated at 28° C. for 20 days. The nitrogen in the soil was analyzed in respective forms. The results were as in Table 3. The data are mean values in three experiments. For comparison, there are also mentioned the results of incubation of the soil alone and of the soil with the addition of an aqueous solution of 0.27% urea.

TABLE 3

| Treating compositions | NH₄—N N in mg./50 g. of soil | NO₃—N N in mg./50 g. of soil |
|---|---|---|
| None (soil alone) | 0.1 | 0.4 |
| Urea | 0.5 | 13.8 |
| Urea+2-amino-4-chloro-6-methyl pyrimidine. | 8.9 | 5.2 |

*Example 4*

2 parts of 2-amino-4-chloro-6-trichloromethylpyrimidine, 20 parts of sodium dodecyl benzene sulfonate and 78 parts of xylene were mixed together to obtain an emulsifiable composition. 25 g. of this mixture were added to 100 cc. of water and were stirred to obtain an emulsion. 7.5 cc. of this emulsion were added to 1.2 liters of an aqueous solution of 1% monoammonium phosphate. 12 cc. of the thus-obtained solution were mixed with 50 g. of soil. The mixture was incubated at 28° C. for 20 days. The nitrogen in the soil was analyzed in respective forms. Thus the values shown in Table 4 were obtained. The data are mean values in three experiments. Further, for comparision, there are also mentioned the results of incubation of the soil alone under the same conditions and of the soil with the addition of 12 cc. of an aqueous solution of 1% monoammonium phosphate under the same conditons.

TABLE 4

| Treating compositions | NH₄—N N in mg./50 g. of soil | NO₃—N N in mg./50 g. of soil |
|---|---|---|
| None (soil alone) | 0.1 | 0.4 |
| Monoammonium phosphate | 0.2 | 14.1 |
| Monoammonium phosphate+2-amino-4-chloro-6-trichloro-methyl-pyrimidine. | 8.4 | 6.0 |

*Example 5*

0.7 part of 2-amino-4-chloro-6-methylpyrimidine, 35.7 parts of monoammonium phosphate, 31.8 parts of urea and 31.6 parts of potassium chloride were crushed and mixed together. The mixture was granulated to be a granular fertilizer composition of a granule diameter of 1 to 3 mm. by rolling the mixture in a rotary cylinder. This granular fertilizer composition was added to 50 g. of soil so as to obtain a bulk mixture containing 4.55 mg. of nitrogen and was well mixed A glass tube of an inside diameter of 23 mm. sealed at the lower end with filter paper and gauze was charged with the thus-obtained mixture and was buried in a field so that the upper end of the glass tube was flushed with the ground surface. On the 20th, 40th and 60th days after it was buried, the soil in the glass tube was analyzed and the remaining amount of nitrogen was measured. The results were as in Table 5. The data are mean values of three experiments. For comparison, there are also mentioned the results of the same operation as was described above on soil alone and on a mixture prepared by crushing and mixing 35.7 parts of monoammonium phosphate, 31.8 parts of urea and 31.6 parts of potassium chloride, granulating the mixture by rolling it in a rotary cylinder to obtain a granular fertilizer and mixing it in 50 g. of soil so that nitrogen in the soil was 4.55 mg.

TABLE 5.—20TH DAY

| Treating compositions | NH₄—N N in mg./50 g. of soil | NO₃—N N in mg./50 g. of soil |
|---|---|---|
| None (soil alone) | 0.1 | 0.1 |
| Granular fertilizer | 2.9 | 0.5 |
| Granular fertilizer containing 2-amino-4-chloro-6-methylpyrimidine. | 4.0 | 0.0 |
| 40TH DAY | | |
| None (soil alone) | 0.1 | 0.4 |
| Granular fertilizer | 1.4 | 1.7 |
| Granular fertilizer containing 2-amino-4-chloro-6-methylpyrimidine. | 3.5 | 0.0 |
| 60TH DAY | | |
| None (soil alone) | 0.2 | 0.0 |
| Granular fertilizer | 0.3 | 0.3 |
| Granular fertilizer containing 2-amino-4-chloro-6-methylpyrimidine. | 3.0 | 0.0 |

In this invention, the expression "reduced nitrogen fertilizers" means fertilizers containing nitrogen in the reduced state including ammonia, ammonium salts and organic compounds readily convertible in the soil to ammonia or ammonium salts such as urea and cyanamide.

What is claimed is:

1. A method for suppressing the nitrification of ammonium nitrogen in soil and preventing rapid loss of ammonium nitrogen therefrom comprising treating the soil in a plant growing area with a pyrimidine derivative having the formula

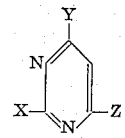

wherein X represents a member of the group consisting of amino, chlorine and trichloromethyl, Y represents a member of the group consisting of hydrogen, amino, chlorine and trichloromethyl, and Z represents a member of the group consisting of methyl, chlorine and trichloromethyl, and wherein said derivative is further characterized in that at least one of the members X, Y and Z is different from the other said members.

2. A method for suppressing the nitrification of ammonium nitrogen in soil and preventing rapid loss of ammonium nitrogen therefrom comprising impregnating soil below the soil surface in the growing area thereof in concentration sufficient to suppress nitrification, with a pyrimidine derivative having the formula

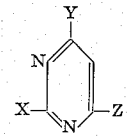

wherein X represents a member of the group consisting of amino and chlorine, and trichloromethyl, Y represents a member of the group consisting of hydrogen, amino, chlorine and trichloromethyl and Z represents a member of the group consisting of methyl, chlorine and trichloromethyl, and wherein, said derivative is further characterized in that at least one of the members X, Y and Z is different from the other said members, said concentration being from about 1 to 100 parts by weight per million parts by weight of soil.

3. A method according to claim 2 wherein the pyrimidine derivative is 2-chloro-4,6-di(trichloromethyl)-pyrimidine.

4. A method according to claim 2 wherein the pyrimidine derivative is 2-amino-4-chloro-6-trichloromethylpyrimidine.

5. A method according to claim 2 wherein the pyrimidine derivative is 2-amino-4-chloro-6-methylpyrimidine.

6. A method according to claim 2 wherein the pyrimidine derivative is used in the form of a composition comprising the pyrimidine derivative in intimate admixture with a soil treating adjuvant.

7. A fertilizer composition comprising a reduced nitrogen fertilizer selected from the group consisting of ammonia, ammonium salts and urea and a pyrimidine derivative having the formula

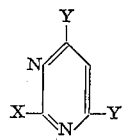

wherein X represents a member of the group consisting of amino, chlorine and trichloromethyl, Y represents a member of the group consisting of hydrogen, amino, chlorine and trichloromethyl and Z represents methyl, chlorine and trichloromethyl, and wherein, said derivative is further characterized in that at least one of the members X, Y and Z is different from the other said members, said pyrimidine derivative being present in a concentration of at least 0.5 percent by weight based on the weight of the reduced nitrogen in the reduced nitrogen fertilizer.

8. A fertilizer composition according to claim 7, wherein the pyrimidine derivative is 2-amino-4-chloro-6-methylpyrimidine.

References Cited by the Examiner

UNITED STATES PATENTS

| | | | |
|---|---|---|---|
| 3,009,804 | 11/1961 | Goring | 71—1 |
| 3,011,885 | 12/1961 | Goring | 71—1 |
| 3,050,382 | 8/1962 | Goring | 71—1 |
| 3,135,594 | 6/1964 | Goring | 71—1 |

DONALL H. SYLVESTER, *Primary Examiner.*

T. D. KILEY, *Assistant Examiner.*